United States Patent [19]

Fabel et al.

[11] Patent Number: 4,545,504

[45] Date of Patent: Oct. 8, 1985

[54] HOT MELT ADHESIVE DELIVERY SYSTEM

[75] Inventors: David A. Fabel, Springfield; John C. Hoagland, Longmeadow; Chester L. Woodworth, East Longmeadow, all of Mass.

[73] Assignee: Monsanto Company, St. Louis, Mo.

[21] Appl. No.: 462,167

[22] Filed: Jan. 31, 1983

[51] Int. Cl.$^4$ .................. B67D 5/62; B67D 5/08
[52] U.S. Cl. .................. 222/55; 222/63; 222/638; 222/146.5; 222/413; 219/388
[58] Field of Search .............. 222/146.1, 146.2, 146.5, 222/413, 561, 14, 16, 386, 63, 52, 54–56, 638, 333, 504, 410; 219/388, 421, 424, 427; 138/30, 31; 401/1, 2; 425/382 R, 376 R, 135, 143, 145, 146, 149, 378 S

[56] References Cited

U.S. PATENT DOCUMENTS

| | | | |
|---|---|---|---|
| 2,646,199 | 7/1953 | Paulsen | 222/146 HE X |
| 3,598,282 | 8/1971 | Phillips | 222/146 HE |
| 3,738,775 | 6/1973 | Strickland | 222/105 X |
| 3,750,905 | 8/1973 | Wolfrom | 222/146 HE X |
| 3,758,001 | 9/1973 | Callan | 222/146 HE |
| 3,773,069 | 11/1973 | Rebentisch | 222/146 HE X |
| 3,853,410 | 12/1974 | Busoni | 222/146 HE |
| 3,952,921 | 4/1976 | Tanner | 222/146 HE |
| 3,964,645 | 6/1976 | Scholl | 222/146 HE |
| 3,971,492 | 7/1976 | Lockwood | 222/146.5 |
| 3,997,080 | 12/1976 | Langstroth | 222/63 X |
| 4,168,790 | 9/1979 | Lothmann et al. | 222/504 X |
| 4,183,448 | 1/1980 | Nash | 222/146 HE |
| 4,323,174 | 4/1982 | Wood | 222/146 HE X |
| 4,456,149 | 6/1984 | Sciortino | 222/63 X |
| 4,475,672 | 10/1984 | Whitehead | 222/561 |

FOREIGN PATENT DOCUMENTS 1957097 5/1971 Fed. Rep. of Germany ...... 222/146 HE

OTHER PUBLICATIONS

"Encyclopedia of Polymer Science and Technology", vol. 8(c), 1968, p. 555.

Primary Examiner—Joseph J. Rolla
Assistant Examiner—Kevin P. Shaver
Attorney, Agent, or Firm—R. Bruce Blance; Linda L. Lewis; William J. Farrington

[57] ABSTRACT

Apparatus for dispensing a hot melt thermoplastic consists of a hopper containing granular thermoplastic, an extruder for melting the molten thermoplastic and delivering it to a manifold and then to an applicator for dispensing the molten thermoplastic. Optionally an accumulator can be attached to allow the molten thermoplastic to accumulate during off-periods of the applicator. Operation of the applicator controls operation of the extruder and the accumulator.

13 Claims, 6 Drawing Figures

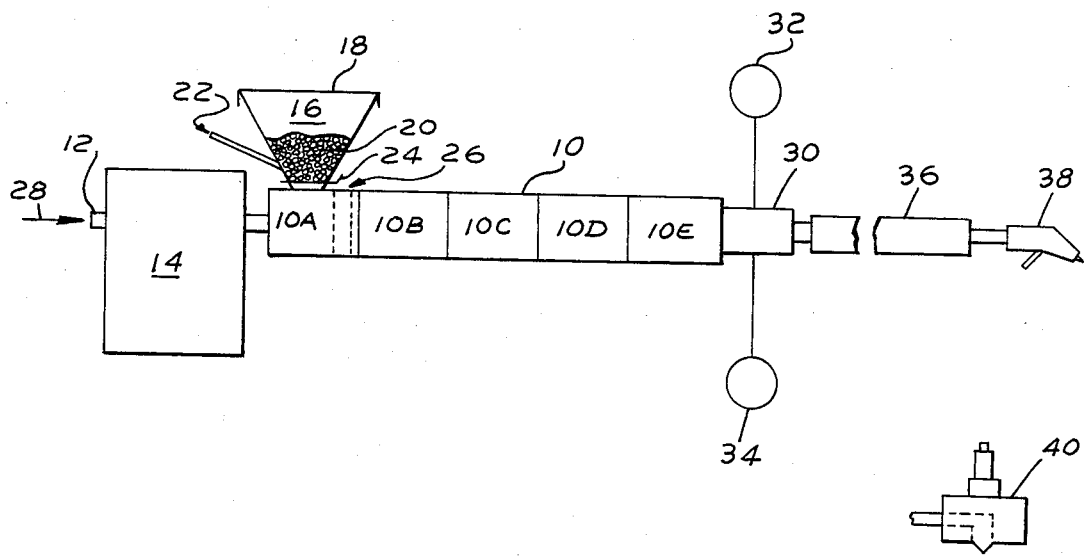
Fig. 1.
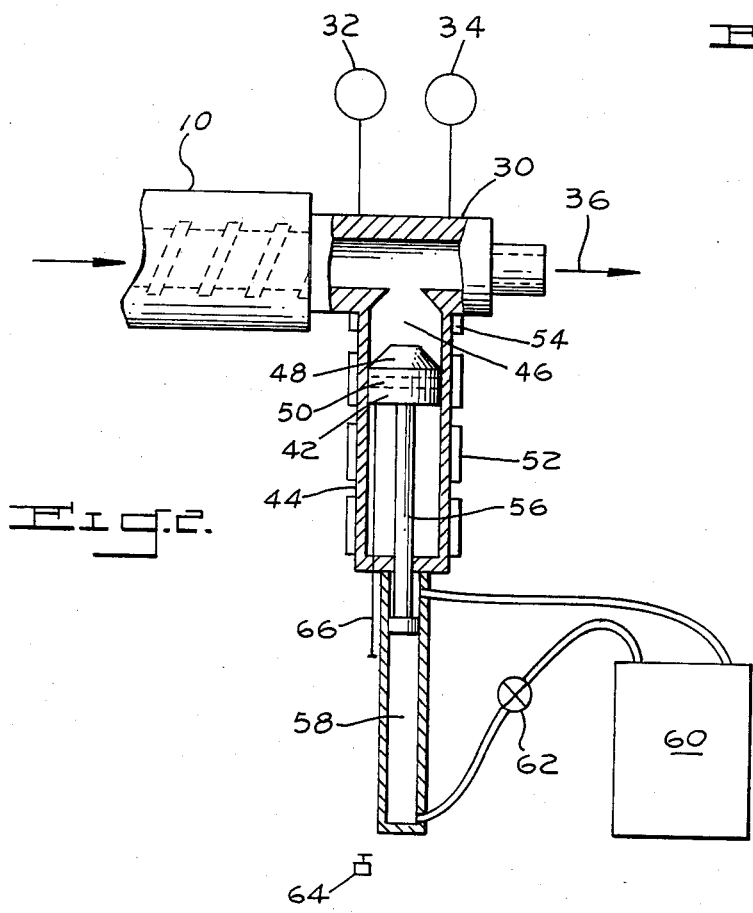
Fig. 1a.
Fig. 2.

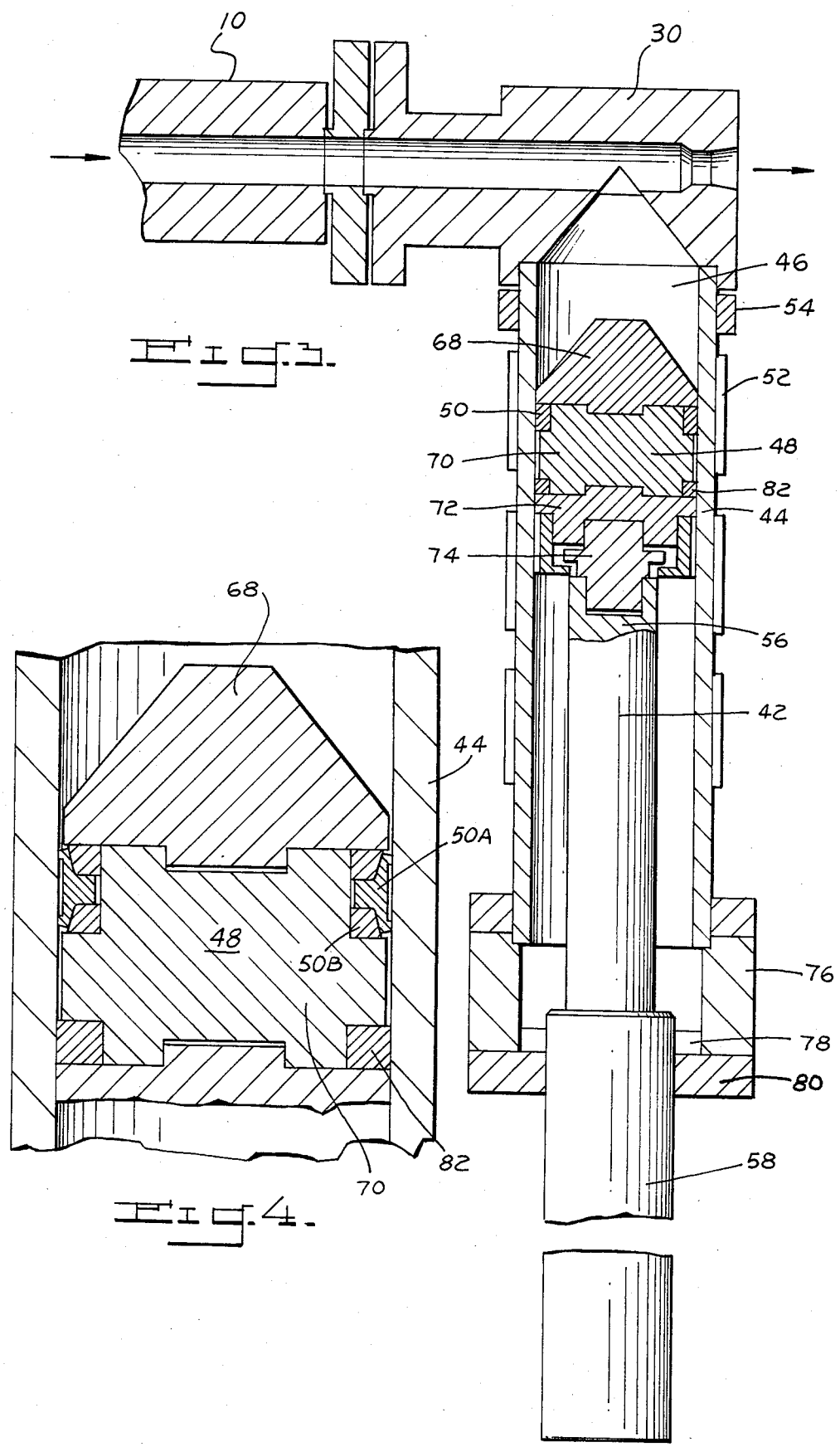

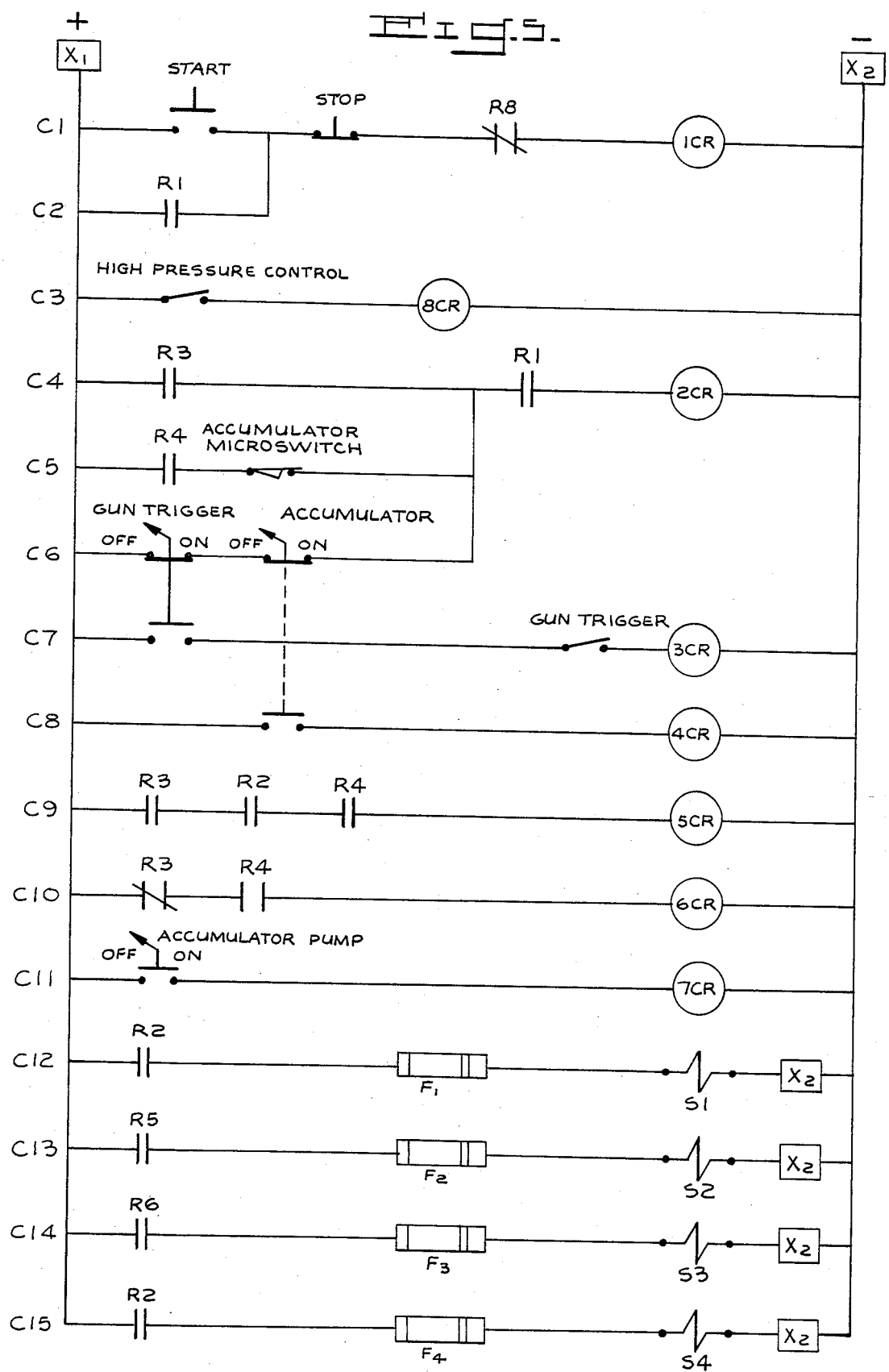

HOT MELT ADHESIVE DELIVERY SYSTEM

BACKGROUND OF THE INVENTION

This invention relates to the application of hot melt adhesive compositions and to an apparatus for melting and application of such systems.

Hot melt thermoplastic adhesive resins are generally supplied in granular or pellet form and are heated to form a liquid melt for application to substrates. When large volumes of hot melt adhesive are required, the resin has usually been melted in a large tank reservoir and supplied to the applicator by means of a gear pump. Such equipment requires long start-up times to melt the adhesive and suffers from the disadvantages of excessive degradation of resin exposed to high temperatures for long periods of time in the melt tank and difficulty of cleaning of the equipment to accommodate change in adhesive composition. Several modifications of such systems have been made to reduce the exposure of the adhesive to high temperatures. Such modifications include localized heating of a block of adhesive, and controlled addition of granules of adhesive to a hot platten or hot grid. In such systems the melt is immediately pumped to the applicator. However equipment which incorporates any such modifications also possesses several deficiencies. For example such equipment is not efficient for application of large volumes of adhesive, it is difficult to maintain at high temperatures, it tends to hold up some resin which degrades and causes variable adhesive performance and it is very troublesome to clean.

Small scale extruders in hand-held applicators have been used for supplying heated caulking compounds, mastics or sealants to a work piece. Such hand-held applicators are fed with plasticized elastomeric compositions in rope form and apply the elastomeric compositions as a ribbon which emerges directly from the extruder exit. The applicators are very limited in capacity and are not designed to accept granules of thermoplastic polymers since the extruder feed zone is operated at a higher temperature than the melting zone. In an apparatus containing a feed screw capable of dispensing large volumes of mastic material, the mastic material is heated in the hopper to soften it before it flows down to the feed screw. Such an apparatus has all the deficiencies of the tank and gear pump dispensers discussed hereinabove.

A small scale apparatus for filling dispensing guns with hot melt thermoplastic adhesive has been disclosed. The thermoplastic in granular form is fed from a hopper to an extruder barrel and the molten adhesive from the extruder is injected into the barrel of the dispensing gun through the gun nozzle which is forcibly held against the extruder outlet by means of a spring loaded socket. When the gun barrel is full, the extruder stops and the gun is removed from the socket. Only small amounts of adhesive are thus available for application and must be applied immediately since the gun has no means for heating. Also overflow from the extruder tends to make the necessary repeated filling of the gun a messy operation and causes frequent interruptions to allow the extruder exit and the gun nozzle to be cleaned.

An apparatus has now been devised which overcomes these several disadvantages and allows hot melt adhesive to be delivered at high rates intermittently or for long periods of time. The apparatus comprises:

(a) a single screw, extruder equipped with means to rotate the screw and with means to start and stop the screw rotating means, and having a first zone for receiving solid thermoplastic, a second zone for melting the thermoplastic, and a third zone for metering the discharge of the molten thermoplastic from the extruder;

(b) a reservoir containing the thermoplastic in the form of solid granules, the reservoir being attached to the barrel of the extruder at the receiving zone and having a throat communicating with the extruder barrel, through which the solid granules are fed to the extruder;

(c) cooling means at the receiving zone of the barrel of the extruder to allow the thermoplastic therein to remain in granular form until it is passed to the melting zone of the extruder;

(d) heating means in the barrel of the extruder to progressively heat and melt the thermoplastic in the melting zone and maintain it molten in the metering zone; and (e) a heated manifold to receive the molten thermoplastic from the discharge end of the extruder, to maintain it in the molten state and to distribute it to at least one applicator; said at least one applicator comprising a housing, a barrel to receive the molten thermoplastic from the manifold, the barrel terminating in a nozzle from which the molten thermoplastic can be discharged, heating elements and heat sensors attached to the barrel to allow the thermoplastic to be maintained in the molten state, means in the applicator barrel to allow the molten thermoplastic to flow through the barrel and be discharged from the nozzle, and means to actuate and de-actuate the flow-allowing means; wherein the means to actuate the flow-allowing means in the applicator barrel also actuates the starting means of the extruder and the means to de-actuate the flow-allowing means in the applicator barrel also actuates the stopping-means for the screw-rotating means.

Preferably the apparatus is equipped with a pressure overload sensing means which actuates the means for stopping the screw-rotating means when the pressure reaches a set overload value.

The advantages provided by this apparatus include the capability of delivering melt over a broad range of delivery rates, the ease of varying and regulating delivery rates, the short residence time of the thermoplastic in the heated zones of the apparatus, the ease of achieving and controlling high temperatures in the melt, the ease of cleaning the apparatus and changing thermoplastics, the option of using robotic control of the discharge of the melt from the applicator, the option of attaching a plurality of hoses and applicators, and the option of attaching an accumulator to the manifold to provide a reservoir for the melt.

The apparatus with an accumulator attached to the manifold provides a preferred embodiment of the invention. The accumulator comprises a piston cylinder to receive molten thermoplastic from the manifold, a piston to deliver molten thermoplastic from the cylinder to the manifold, a piston ram, a piston ram control, means to actuate the piston ram control, means to de-actuate the extruder screw-rotating means, and heating means attached to the piston cylinder to maintain the thermoplastic in the piston cylinder at the desired temperature, wherein during the applicator discharge mode the piston drive control is actuated to cause the piston to deliver molten thermoplastic from the piston cylinder into the manifold, wherein during the applicator closed mode, the piston drive control, and the screw-rotating means of the extruder are actuated to allow the extruder to deliver molten thermoplastic via the manifold to the piston chamber; and wherein when the piston cylinder is full of molten thermoplastic during the applicator closed mode, the extruder screw-rotating means is de-actuated. The accumulator provides the advantage during extended periods of intermittent operation of the applicator of allowing the extruder to run continuously and the advantage of providing an applicator discharge rate which can be appreciably greater than the extruder output. These and other features of the invention are illustrated in the drawings.

FIG. 1 is a schematic drawing of an extruder-applicator apparatus according to the invention.

FIG. 1a is an alternate view of an applicator gun.

FIG. 2 is a schematic drawing of an extruder-accumulator applicator apparatus according to the invention.

FIG. 3 is a horizontal section of the accumulator.

FIG. 4 is a horizontal section of the piston of the accumulator, showing a seal construction.

FIG. 5 is an electrical schematic for the extruder-accumulator and extruder-accumulator-applicator. The drawings are for the purpose of illustration only and are not intended as a definition of the limits of the invention.

The extruder-applicator (FIG. 1) comprises an extruder 10 with zones 10 A, B, C, D and E. 10A is the feed zone which receives thermoplastic granules from the reservoir or hopper 16 in which the thermoplastic is stored. The hopper has a cover 18 which fits loosely on the hopper and an entry port 22 through which a stream of dry nitrogen is passed to maintain a dry inert atmosphere around the thermoplastic granules. Optionally a feed control means can be installed at the hopper throat to control the feed of granules from the hopper to the feed zone of the extruder. Such a feed control means can consist of a slide valve 24 actuated by a solenoid. The slide valve solenoid opens the slide valve when the screw rotating means is actuated and closes the slide valve when the screw rotating means is shut off. Zones 10 B, 10 C, 10D and 10E of the extruder are equipped with heating elements placed along the barrel of the extruder and temperature sensors and controllers which allow a temperature gradient to be developed along the barrel, the gradient being conveniently selected to range from about 25° C. below the flow point of the thermoplastic at the hopper end of zone 10 B to about 80° C. above the flow point of the thermoplastic at the exit from the extruder into the manifold 30. The flow point is determined on a Fisher Johns melting point apparatus and is the temperature at which a granule of thermoplastic, under pressure applied with a spatula, deforms without recovery when the pressure is removed.

The drive 14 for the extruder screw (details not shown) acts on the extruder screw shaft 12 which is hollow in the drive section and the feed section 10A. Cooling of the feed section of the extruder, zone 10A is supplied by streams of air applied around the barrel 26, and through a tube insert 28 which extends through the hollow portion of the extruder screw shaft. Such cooling is necessary to prevent bridging and blocking of the thermoplastic granules in the hopper throat and feed section of the extruder. Needle valves and rotameters in the air supply tubes allow the rate of air supply to be set to provide the desired degree of cooling. The air cooling at 26 is conveniently achieved by supplying the air stream to a groove around the barrel at zone 10A downstream from the hopper to isolate the feed zone and the hopper sufficiently from the barrel heaters. Cooling of the feed zone could also be obtained with liquid coolants circulated within a closed jacket around the feed zone section of the barrel and within the hollow section of the extruder screw shaft. Such liquid coolant should be maintained at a convenient elevated temperature to minimize the mechanical energy input required to assist the melting of the thermoplastic in the extruder but below the flow point of the thermoplastic to avoid premature softening of the thermoplastic in the feed zone of the extruder and the throat of the hopper.

The molten thermoplastic is passed through the melting zone 10B, 10C of the extruder and the metering or pumping zone 10D, 10E and into manifold 30 which is equipped with heaters, a temperature sensor 32 and a pressure indicator and control 34 such as the the DI-352E Pressure Indicator supplied by Harrel Incorporated, Norwalk, Conn. The temperature of the molten thermoplastic is maintained at the selected level, conveniently at least 25° C. above the flow point of the thermoplastic. The pressure indicator and control 34 is set at a level above which it automatically shuts down the extruder and closes the hopper slide valve if the slide valve is being used. A convenient pressure level is about 8000 kPa. The molten thermoplastic is passed from the manifold 30 to the applicator or applicators which are conveniently connected to the manifold by flexible heated hose 36 equipped with temperature sensors and controllers to allow the temperature of the molten thermoplastic to be maintained at the desired level. The applicators can be manually operated guns 38 comprising a housing, a barrel, heaters, heat sensors, a valve to allow and to stop the flow of molten thermoplastic, a nozzle from which the thermoplastic is delivered and a trigger which opens the valve and allows the thermoplastic to flow. Alternatively, the applicators can be electrically, hydraulically or pneumatically controlled applicators 40 comprising a housing, a barrel, heaters, heat sensors, a valve to allow and to stop the flow of molten thermoplastic, a nozzle from which the thermoplastic is delivered and a solenoid, hydraulic or pneumatic system to open and close the valve. The details of the applicators are not shown. The control which causes the valve to open, also actuates the drive for the extruder screw and the hopper slide valve if such a valve is present in the equipment.

FIG. 2 shows the accumulator 42 attached by the cylinder flange 54 to the manifold 30. When the applicator is in the closed mode, and the accumulator is empty, molten thermoplastic flows from the extruder 10 into the manifold 30 and thence into the piston chamber 46 by pushing against the piston 48 equipped with piston seal 50 which engages against the piston cylinder 44 which is advantageously plated for wear resistance. Heating elements with sensors 52 are attached to the piston cylinder to allow the temperature to be maintained so that the thermoplastic remains in the molten state. The movement of the piston is determined by the piston ram 56 and the hydraulic piston ram control. The ram control comprises a hydraulic cylinder 58 in which the ram is held in a sliding fit, a rotary vane pump 60 which provides hydraulic fluid to the hydraulic cylinder to push the ram in the exhaust stroke of the piston and a flow control valve 62 to allow control of the piston rate and hence the rate of delivery of the molten thermoplastic from the accumulator to the manifold. When the applicator is in the closed mode and the accumulator is empty and the extruder is on, the pressure of the molten thermoplastic in the manifold forces the piston 48 along the piston cylinder until the piston chamber 46 is full of molten thermoplastic. The actuator rod 66 then opens microswitch 64 which shuts off the extruder and closes the hopper slide valve. When the applicator is in the open mode and the piston chamber 46 contains molten thermoplastic, a solenoid actuates the rotary vane pump which pumps hydraulic fluid against the head of the ram and causes piston 48 to push the molten thermoplastic out of cylinder chamber 46 and into manifold 30. Microswitch 64 closes when the actuator rod is carried away from it by the piston.

FIG. 3 illustrates a horizontal section of the accumulator showing the manifold 30 attached to the discharge end of the extruder 10. The accumumulator 42 is attached by cylinder flange 54 to the manifold 30 which advantageously can be shaped as shown in the drawings, to provide a tapered end to the piston chamber 46 into which a similarly tapered head 68 of piston 48 can fit so that substantially all of the molten thermoplastic in the piston chamber 46 can be expelled into the manifold upon completion of the exhaust stroke of the piston. The piston comprises the head 68, a spacer 70 and a cap 72 assembled to hold the piston seal 50 and the O-ring 82 in place. A pusher 74 attached to the piston ram 56 engages the piston head. The end of the accumulator remote from manifold 30 is bolted to the hydraulic cylinder by means of the spacer 76, flange 80 and lock ring 78.

FIG. 4 illustrates the configuration of a flexible metallic compression seal 50 for the piston inserted between the piston head 68 and the spacer 70. The seal comprises a contoured flexible metal ring 50A supported by a rigid metal ring 50B and designed to be deflected when the seal retaining bolts in spacer 70 are tightened so that a tight seal between the piston and the piston cylinder is maintained during operation of the accumulator. The materials of construction of rings 50A and 82 which engage against the piston cylinder 44 are selected to be compatible with and inert to the molten thermoplastic and to withstand the temperature at which the equipment is operated. Advantageously for high temperature applications, the rings are made of cast iron. The rigid supporting ring 50B is advantageously made of suitable steel.

FIG. 5 presents an electrical diagram of the control system for the extruder applicator and the extruder-accumulator-applicator. C1, C2, C3 etc. are circuits 1, 2, 3 etc. 1CR is the relay control for relay 1. R1, F1 and S1 denote relay 1, fuse 1 and solenoid 1 respectively. When the start button is depressed in circuit 1, 1CR is energized causing R1 to close (provided R8 is closed) and power is provided to the unit through circuit 2. R8 is normally closed unless the pressure overload point in manifold 30 has been reached, in which case the high pressure control switch of circuit 3 closes and energizes 8CR which causes relay 8 to open and shuts the power off. When the power stack switch of the applicator trigger or applicator solenoid is switched on (circuit 6), and the applicator trigger is pulled or the applicator solenoid is activated to open the applicator valve, the microswitch of circuit 7 is closed thus energizing 3CR and closing relay 3, and since R1 is closed, 2CR becomes energized and activates the solenoid S1 of circuit 12 to start the extruder screw drive. If a hopper slide valve and solenoid S4 are installed in the equipment, when 2CR is energized S4 is actuated and the slide valve opens (circuit 15). When the applicator trigger is released or the solenoid is activated to close the applicator valve, the microswitch of circuit 7 is opened and relay 3 opens, causing relay 2 to open shutting off the extruder screw drive and closing the hopper slide valve. This control sequence occurs regardless of whether the accumulator system is installed or activated.

When, with the accumulator system attached to the extruder-applicator system, the power stack switches of the applicator trigger/solenoid and accumulator are switched on, and the applicator is in the open or discharge mode with applicator microswitch (circuit 7) closed, 3CR and 4CR (circuits 7 and 8) are both energized and relays 3 and 4 are closed, energizing 2CR, and closing R2. With R2 closed, the extruder screw drive starts, and 5CR is energized causing relay 5 to close and to activate the hydraulic ram solenoid control to place the accumulator in the emptying mode (circuit 13).

When the accumulator is at least partly empty, and the applicator is in the closed mode with the microswitch of circuit 7 open, relay 3 is open, 5CR is de-energized and relay 5 is open. However 4CR is energized and R4 is closed, and since the accumulator is not full, the accumulator microswitch is closed so that 2CR is energized (circuit 5), R2 is closed and the extruder screw drive is running. Also 6CR (circuit 10) is energized, R6 is closed (circuit 14) and the solenoid control of the hydraulic ram is activated to place the accumulator in the filling mode. When the accumulator is full, the accumulator microswitch opens, causing the extruder screw drive and the accumulator hydraulic system to shut off.

The extruder screw-rotating means or drive can be a high torque hydraulic drive which responds readily to intermittent operation or it can be an electric motor equipped with an accelerator control to prevent overcurrent circuit break. Such an accelerator control should spread the acceleration of the motor to its maximum speed over a period of about 3 seconds.

The extruder-applicator of the present invention provides wide latitude in delivery rates of molten thermoplastic. For example an extruder with a screw of 63.5 mm diameter rotating at a rate of the range of 10 to 100 rpm, can provide delivery rates in the range of 0.25 to 6.0 grams per second. When an accumulator is attached the range can be readily extended to 24 g. per second for short periods of time depending upon the accumulator capacity.

While the system for filling and emptying the accumulator depends on the pressure differential between the manifold and the ram hydraulic system, an alternative system can be based on a set pressure at the entrance to the applicator hose, with the accumulator hydraulic system responding to maintain the set pressure level.

The rate of cooling of the feed zone of the extruder is adjusted according to the extruder screw speed to maintain the thermoplastic in granular form in the feed zone of the extruder and prevent bridging and irregular feeding to the melt zone.

The feed means for supplying granular thermoplastic from the hopper to the extruder described hereinabove is essentially gravity flow through the throat of the hopper, the flow starting when the extruder drive is switched on and stopping when the extruder drive is shut off. Optionally the flow can be controlled with a solenoid actuated slide valve. Optionally a timed sequence for the delivery of molten thermoplastic adhesive can be used with the slide valve when a repetitive application cycle is being practiced. In such a sequence the slide valve can be closed at a time interval in the range of 5 to 15 seconds before the applicator is placed in the closed mode and the extruder is shut off. In tnis way, the risk of a build up of semi-molten thermoplastic in the feed zone can be further lessened.

A feed screw at the bottom of the hopper, optionally driven by the extruder drive, may be used to force feed the granular thermoplastic through the hopper throat into the feed zone of the extruder barrel. In such a system the hopper screw is generally put into motion simultaneously with the extruder screw.

The conduits which are used to connect the manifold to the applicator may be rigid pipes or flexible hoses depending on whether it is desired to move the work piece under the applicator or the applicator over the work piece to provide the desired line or pattern of molten thermoplastic on the work piece. When flexible hoses are used they may be of metal or of reinforced plastic. For high temperature applications a flexible metal hose with a polytetrafluoroethylene plastic lining is used advantageously. The conduit has heating elements and heat sensors attached along its length, to allow the molten thermoplastic to be maintained at the desired temperature of application. When large work pieces are being adhered with the molten thermoplastic, they can advantageously be preheated to a suitable temperature to provide a longer open time for the adhesive.

The extruder-applicator of the present invention is particularly suitable for melting and delivery of high melting adhesives such as the polyesteramides disclosed in U.S. Pat. No. 3,650,999. With an extruder-applicator comprising an extruder of 63.5 mm screw diameter and 1020 mm length, divided into a feed zone of 318 mm, a melt zone of 381 mm and a metering zone of 318 mm, connected to a manifold of 25 mm internal diameter, a heated hose lined with polytetrafluoroethylene, 5 m in length and 16 mm internal diameter, and an applicator gun with a trigger actuated valve and a nozzle of 10 mm internal diameter, a polyesteramide of melt viscosity 1000 poise at 218° C. was dispensed at a temperature of 260° C. and at a rate in the range of 3 to 20 g per sec. with the extruder screw speed in the range of 17 to 100 rpm. The temperature gradient in the extruder was 218°, 232°, 246° and 260° C. in zones B, C, D and E respectively.

What is claimed is:

1. A system for intermittent supply of a molten thermoplastic, which comprises:
    (a) an extruder comprising a barrel having a single screw therein, said extruder equipped with means to rotate the screw and with means to start and stop the screw rotating means and having a first zone for receiving solid thermoplastic, a second zone for melting the thermoplastic and a third zone for metering the molten thermoplastic from the extruder, said third zone having a discharge end;
    (b) a reservoir containing the thermoplastic in the form of solid granules, the reservoir being attached to the barrel of the extruder at the receiving zone and having a throat communicating with the extruder barrel through which the solid granules are fed to the extruder;
    (c) cooling means at the receiving zone of the barrel of the extruder to allow the thermoplastic therein to remain in granular form until it is passed to the melting zone of the extruder;
    (d) heating means in the barrel of the extruder to progressively heat and melt the thermoplastic in the melting zone and maintain it molten in the metering zone;
    (e) a heated manifold to receive the molten thermoplastic from the discharge end of the extruder, to maintain it in the molten state and to distribute it to at least one heated hose; and
    (f) an applicator attached to the delivery end of said at least one heated hose, said applicator comprising a housing, an applicator barrel to receive the molten thermoplastic from the heated hose, the applicator barrel terminating in a nozzle from which the molten thermoplastic is discharged, a valve in the applicator barrel to allow the molten thermoplastic to flow through the applicator barrel and be discharged from the nozzle, means to open the valve which also actuates the starting means for the screw-rotating means of the extruder and means to close the valve which also actuates the stopping means for the screw-rotating means;

wherein an accumulator is attached to the manifold, said accumulator comprising a piston cylinder to receive molten thermoplastic from the manifold, a piston to deliver molten thermoplastic from the cylinder to the manifold, a piston ram connected to the piston, a piston ram control, means to actuate the piston ram control, said piston having an exhaust stroke and an intake stroke means to de-actuate the extruder screw-rotating means, and heating means attached to the piston cylinder to maintain the thermoplastic in the piston cylinder in the molten state, wherein the piston cylinder (at the exit to the manifold and the piston are tapered to allow substantially complete elimination of the molten thermoplastic from the accumulator at completion of the exhaust stroke of the piston, wherein the piston is equipped with a flexible metallic compression seal which bears against the piston cylinder.. to wipe the wall of the piston cylinder clean of molten thermoplastic on the exhaust stroke of the piston, wherein during discharge of molten thermoplastic from the applicator the piston ram control is actuated to cause the piston to deliver molten thermoplastic from the piston cylinder into the manifold, wherein during the valve closed position of the applicator, the piston ram control and the screw-rotating means of the extruder are actuated to allow the extruder to deliver molten thermoplastic via the manifold to the piston cylinder, and wherein when the piston cylinder is full of molten thermoplastic during the valve closed position of the applicator, the extruder screw-rotating means is de-actuated; and wherein the manifold is equipped with a pressure overload sensing means which actuates a circuit breaking means and shuts off power to the system when the pressure of the molten thermoplastic reaches a set overload value.

2. A system for intermittent supply of a molten thermoplastic, which comprises:
    (a) an extruder comprising a barrel having a single screw therein, said extruder equipped with means to rotate the screw and with means to start and stop the screw-rotating means, and having a first zone for receiving solid thermoplastic, a second zone for melting the thermoplastic, and a third zone for metering the molten thermoplastic from the extruder, said third zone having a discharge end (b) a reservoir containing the thermoplastic in the form of solid grannules, the reservoir being attached to the barrel of the extruder at the receiving zone and having a throat communicating with the extruder barrel, through which the solid granules are fed from the reservoir to the extruder;

(c) cooling means at the receiving zone of the barrel of the extruder to allow the thermoplastic therein to remain in granular form until it is passed to the melting zone of the extruder;

(d) heating means in the barrel of the extruder to progressively heat and melt the thermoplastic in the melting zone and maintain it molten in the metering zone; and (e) a heated manifold to receive the molten thermoplastic from the discharge end of the extruder, to maintain it in the molten state and to distribute it to at least one applicator; said at least one applicator comprising a housing, an applicator barrel to receive the molten thermoplastic from the manifold, the applicator barrel terminating in a nozzle from which the molten thermoplastic is discharged, heating elements and heat sensors attached to the applicator barrel to allow the thermoplastic to be maintained in the molten state, means in the applicator barrel to allow the molten thermoplastic to flow through the applicator barrel and be discharged from the nozzle, and means to actuate and de-actuate the flow-allowing means; wherein the means to actuate the flow-allowing means in the applicator barrel also actates the starting means for the screw-rotating means of the extruder; wherein the means to de-actuate the flow-allowing means in the applicator barrel also actuates the stopping-means of the screw-rotating means of the extruder; wherein an accumulator is attached to the manifold, said accumulator comprising a piston cylinder to receive molten thermoplastic from the manifold, a piston to deliver molten thermoplastic from the cylinder to the manifold, a piston ram connected to the piston, a piston ram control, means to actuate the piston ram control, means to de-actuate the extruder screw-rotating means, and heating means attached to the piston cylinder to maintain the thermoplastic in the piston cylinder in the molten state, wherein during discharge of molten thermoplastic from the applicator the piston ram control is actuated to cause the piston to deliver molten thermoplastic from the piston cylinder into the manifold, wherein during the valve closed position of the applicator the piston ram control and the screw-rotating means of the extruder are actuated to allow the extruder to deliver molten thermoplastic via the manifold to the piston cylinder, wherein when the piston cylinder is full of molten thermoplastic during the valve closed position of the applicator, the extruder screw-rotating means is de-actuated.

3. A system for intermittent supply of a molten thermoplastic, which comprises:

(a) an extruder comprising a barrel having a single screw therein, said extruder equipped with means to rotate the screw and with means to start and stop the screw-rotating means, and having a first zone for receiving solid thermoplastic, a second zone for melting the thermoplastic, and a third zone for metering the molten thermoplastic from the extruder, said third zone having a discharge end (b) a reservoir containing the thermoplastic in the form of solid granules, the reservoir being attached to the barrel of the extruder at the receiving zone and having a throat communicating with the extruder barrel, through which the solid granules are fed to the extruder;

(c) cooling means at the receiving zone of the barrel of the extruder to allow the thermoplastic therein to remain in granular form until it is passed to the melting zone of the extruder;

(d) heating means in the barrel of the extruder to progressively heat and melt the thermoplastic in the melting zone and maintain it molten in the metering zone;

(e) a heated manifold to receive the molten thermoplastic from the discharge end of the extruder, to maintain it in the molten state and to distribute it to at least one heated hose; and (f) an applicator attached to the delivery end of said at least one heated hose, said applicator comprising a housing, an applicator barrel to receive the molten thermoplastic from the heated hose, the applicator barrel terminating in a nozzle from which the molten thermoplastic is discharged, a valve in the applicator barrel to allow the molten thermoplastic to flow through the applicator barrel and be discharged from the nozzle, means to open the valve which also actuates the starting means for the screw-rotating means of the extruder, and means to close the valve, which also actuates the stopping means for the screw-rotating means; wherein the manifold is equipped with a pressure overload sensing means which actuates a circuit breaking means and shuts off power to the system when the pressure reaches a set overload value; wherein an accumulator is attached to the manifold, said accumulator comprising a piston cylinder to receive molten thermoplastic from the manifold, a piston to deliver molten thermoplastic from the cylinder to the manifold, a piston ram connected to the piston, a piston ram control, said piston having an exhaust stroke and an intake stroke, means to actuate the piston ram control, means to de-actuate the extruder screw-rotating means, and heating means attached to the piston cylinder to maintain the thermoplastic in the piston cylinder in a molten state, wherein during discharge of molten thermoplastic from the applicator the piston ram control is actuated to cause the piston to deliver molten thermoplastic from the piston cylinder into the manifold, wherein during the valve closed position of the applicator, the piston ram control and the screw-rotating means of the extruder are actuated to allow the extruder to deliver molten thermoplastic via the manifold to the piston cylinder, wherein when the piston cylinder is full of molten thermoplastic during the valve closed position of the applicator, the extruder screw-rotating means is de-actuated, wherein the piston cylinder at the exit to the manifold and the piston are tapered to allow substantially complete elimination of the molten thermoplastic from the accumulator at completion of the exhaust stroke of the piston, wherein the piston is equipped with a flexible metallic compression seal which bears against the piston cylinder to wipe the wall of the piston cylinder clean of molten thermoplastic on the exhaust stroke of the piston.

4. A system for intermittent supply of a molten thermoplastic, which comprises:
   (a) an extruder comprising a barrel having a single screw therein, said extruder equipped with means to rotate the screw and with means to start and stop the screw-rotating means, and having a first zone for receiving solid thermoplastic, a second zone for melting the thermoplastic, and a third zone for metering the molten thermoplastic from the extruder, said third zone having a discharge end,
   (b) a reservoir containing the thermoplastic in the form of solid granules, the reservoir being attached to the barrel of the extruder at the receiving zone and having a throat communicating with the extruder barrel through which the solid granules are fed to the extruder;
   (c) cooling means at the receiving zone of the barrel of the extruder to allow the thermoplastic therein to remain in granular form until it is passed to the melting zone of the extruder;
   (d) heating means in the barrel of the extruder to progressively heat and melt the thermoplastic in the melting zone and maintain it molten in the metering zone;
   (e) a heated manifold to receive the molten thermoplastic from the discharge end of the extruder, to maintain it in the molten state and to distribute it to at least one heated hose; and
   (f) an applicator attached to the delivery end of said at least one heated hose, said applicator comprising a housing, an applicator barrel to receive the molten thermoplastic from the heated hose, the applicator barrel terminating in a nozzle from which the molten thermoplastic is discharged, a valve in the applicator barrel to allow the molten thermoplastic to flow through the applicator barrel and be discharged from the nozzle, means to open the valve which also actuates the starting means for the screw-rotating means of the extruder, and means to close the valve, which also actuates the stopping means for the screw-rotating means; wherein the manifold is equipped with a pressure overload sensing means which actuates a circuit breaking means and shuts off power to the system when the pressure reaches a set overload value; wherein an accumulator is attached to the manifold, said accumulator comprising a piston cylinder to receive molten thermoplastic from the manifold, a piston to deliver molten thermoplastic from the cylinder to the manifold, a piston ram connected to the piston, a piston ram control, means to actuate the piston ram control, means to de-actuate the extruder screw-rotating means, and heating means attached to the piston cylinder to maintain the thermoplastic in the piston cylinder in the molten state, wherein during discharge of molten thermoplastic from the applicator the piston ram control is actuated to cause the piston to deliver molten thermoplastic from the piston cylinder into the manifold, wherein during the valve closed position of the applicator, the piston drive control and the screw-rotating means of the extruder are actuated to allow the extruder to deliver molten thermoplastic via the manifold to the piston cylinder, and wherein when the piston cylinder is full of molten thermoplastic during the valve closed position of the applicator, the extruder screw-rotating means is de-actuated.

5. A system for intermittent supply of a molten thermoplastic, which comprises:
   (a) an extruder comprising a barrel having a single screw therein, said extruder equipped with means to rotate the screw and with means to start and stop the screw-rotating means, and having a first zone for receiving solid thermoplastic, a second zone for melting the thermoplastic, and a third zone for metering the molten thermoplastic from the extruder, said third zone having a discharge end;
   (b) a reservoir containing the thermoplastic in the form of solid granules, the reservoir being attached to the barrel of the extruder at the receiving zone and having a throat communicating with the extruder barrel, through which the solid granules are fed from the reservoir to the extruder;
   (c) cooling means at the receiving zone of the barrel of the extruder to allow the thermoplastic therein to remain in granular form until it is passed to the melting zone of the extruder;
   (d) heating means on the barrel of the extruder to progressively heat and melt the thermoplastic in the melting zone and maintain it molten in the metering zone; and
   (e) a heated manifold to receive the molten thermoplastic from the discharge end of the extruder, to maintain it in the molten state and to distribute it to at least one applicator; said at least one applicator comprising a housing, an applicator barrel to receive the molten thermoplastic from the manifold, the applicator barrel terminating in a nozzle from which the molten thermoplastic is discharged, heating elements and heat sensors attached to the applicator barrel to allow the thermoplastic to be maintained in the molten state, means in the applicator barrel to allow the molten thermoplastic to flow through the applicator barrel and be discharged from the nozzle, and means to actuate and de-actuate the flow-allowing means; wherein the means to actuate the flow-allowing means in the applicator barrel also actuates the starting means for the screw-rotating means of the extruder, and wherein the means to deactuate the flow-allowing means in the applicator barrel also actuates the stopping-means of the screw-rotating means of the extruder; wherein an accumulator is attached to the manifold, said accumulator comprising a piston cylinder to receive molten thermoplastic from the manifold, a piston to deliver molten thermoplastic from the cylinder to the manifold, a piston ram connected to the piston a piston ram control, said piston having an exhaust stroke and an intake stroke, means to actuate the piston ram control, means to de-actuate the extruder screw-rotating means, and heating means attached to the piston cylinder to maintain the thermoplastic in the piston cylinder in the molten state, wherein during discharge of molten thermoplastic from the applicator the piston ram control is actuated to cause the piston to deliver molten thermoplastic from the piston cylinder into the manifold, wherein during the valve closed position of the applicator the piston ram control and the screw-rotating means of the extruder are actuated to allow the extruder to deliver molten thermoplastic via the manifold to the piston cylinder, and wherein when the piston cylinder is full of molten thermoplastic during the valve closed mode of the applicator, the extruder screw-rotating means is de-actuated.

6. The combination of claim 5 wherein the piston cylinder at the exit to the manifold and the piston are tapered to allow substantially complete elimination of the molten thermoplastic from the accumulator at completion of the exhaust stroke of the piston.

7. The combination of claim 5 wherein the piston is equipped with a flexible metallic compression seal which bears against the piston cylinder to wipe the wall of the piston cylinder clean of molten thermoplastic on the exhaust stroke of the piston.

8. A system for intermittent supply of a molten thermoplastic, which comprises:
   (a) an extruder comprising a barrel having a single screw therein, said extruder equipped with means to rotate the screw and with means to start and stop the screw-rotating means, and having a first zone for receiving solid thermoplastic, a second zone for melting the thermoplastic, and a third zone for metering the molten thermoplastic from the extruder, said third zone having a discharge end;
   (b) a reservoir containing the thermoplastic in the form of solid granules, the reservoir being attached to the barrel of the extruder at the receiving zone and having a throat communicating with the extruder barrel, through which the solid granules are fed to the extruder, wherein the reservoir is equipped with a solenoid-actuated valve to control the supply of thermoplastic granules from the reservoir to the extruder, said solenoid being actuated by a tuning control
   (c) cooling means at the receiving zone of the barrel of the extruder to allow the thermoplastic therein to remain in granular form until it is passed to the melting zone of the extruder;
   (d) heating means in the barrel of the extruder to progressively heat and melt the thermoplastic in the melting zone and maintain it molten in the metering zone; and
   (e) a heated manifold to receive the molten thermoplastic from the discharge end of the extruder, to maintain it in the molten state and to distribute it to at least one applicator; said at least one applicator comprising a housing an applicator barrel to receive the molten thermoplastic from the manifold, the applicator barrel terminating in a nozzle from which the molten thermoplastic is discharged, heating elements and heat sensors attached to the applicator barrel to allow the thermoplastic to be maintained in the molten state, means in the applicator barrel to allow the molten thermoplastic plastic to flow through the applicator barrel and be discharged from the nozzle, and means to actuate and de-actuate the flow-allowing means; wherein the means to actuate the flow-allowing means in the applicator barrel also actuates the starting means for the screw-rotating means of the extruder, wherein the means to de-actuate the flow-allowing means in the applicator barrel also actuates the stopping-means of the screw-rotating means of the extruder, and wherein during discharge of molten thermoplastic from the applicator said timing control actuates the solenoid to close the reservoir slide valve at a time in the range of 5 to 15 seconds before the flow-allowing means in the applicator barrel is de-actuated and the extruder screw-rotating means is stopped.

9. The system of claim 8 wherein the flow-allowing means in the applicator barrel is a valve and the means to actuate the valve is a trigger and the means to de-actuate the valve is a spring.

10. The system of claim 8 wherein a pressure overload sensing means is provided which actuates a circuit breaking means and shuts off power to the system when the pressure of the molten thermoplastic reaches a set overload value.

11. The system of claim 10 wherein the pressure overload sensing means is located at the manifold.

12. The system of claim 8 wherein a conduit connects said at least one applicator to the manifold said conduit having heating elements, the heating elements of the conduit being controlled to maintain the thermoplastic in the molten state.

13. The system of claim 12 wherein the conduit is a hose lined with polytetrafluorethylene.

* * * * *